(12) United States Patent
Breeze-Stringfellow et al.

(10) Patent No.: US 8,702,398 B2
(45) Date of Patent: Apr. 22, 2014

(54) HIGH CAMBER COMPRESSOR ROTOR BLADE

(75) Inventors: Andrew Breeze-Stringfellow, Cincinnati, OH (US); David Scott Clark, Liberty Township, OH (US); Brent F. Beacher, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 473 days.

(21) Appl. No.: 13/072,027

(22) Filed: Mar. 25, 2011

(65) Prior Publication Data

US 2012/0244005 A1 Sep. 27, 2012

(51) Int. Cl.
*F01D 5/14* (2006.01)

(52) U.S. Cl.
USPC .................. 416/242; 416/243; 416/DIG. 5

(58) Field of Classification Search
USPC ........ 416/223 R, 223 A, DIG. 2, DIG. 5, 242, 416/243; 415/191
See application file for complete search history.

(56) References Cited

U.S. PATENT DOCUMENTS

| | | |
|---|---|---|
| 3,467,197 A | 9/1969 | Spivey |
| 4,826,400 A * | 5/1989 | Gregory .................... 415/181 |
| 5,064,345 A | 11/1991 | Kimball |
| 5,167,489 A | 12/1992 | Wadia et al. |
| 6,299,412 B1 | 10/2001 | Wood et al. |
| 6,312,219 B1 | 11/2001 | Wood et al. |
| 6,508,630 B2 | 1/2003 | Liu et al. |
| 6,899,526 B2 | 5/2005 | Doloresco et al. |
| 7,726,937 B2 | 6/2010 | Baumann et al. |
| 8,128,376 B2 | 3/2012 | Karem |
| 8,133,012 B2 | 3/2012 | Nagai et al. |
| 8,147,207 B2 | 4/2012 | Orosa et al. |
| 8,167,567 B2 | 5/2012 | Kirchner et al. |
| 2001/0036401 A1* | 11/2001 | Harvey et al. ................. 415/115 |
| 2005/0031454 A1 | 2/2005 | Doloresco et al. |

(Continued)

FOREIGN PATENT DOCUMENTS

| | | |
|---|---|---|
| EP | 1505302 A1 | 2/2005 |
| EP | 1930598 A2 | 6/2008 |
| GB | 2431697 A | 5/2007 |

OTHER PUBLICATIONS

Songtao et al, Journal of Thermal Science vol. 18 No. 2 (2009) pp. 119-125.*

(Continued)

*Primary Examiner* — Edward Look
*Assistant Examiner* — Juan G Flores
(74) *Attorney, Agent, or Firm* — Global Patent Operation; Vivek P. Shankam

(57) ABSTRACT

A rotor blade having an airfoil for a compressor is described. The airfoil has an airfoil root, an airfoil tip located at a spanwise distance from the airfoil root, a leading edge extending from the airfoil root to the airfoil tip, an inner span region ("S1") between the airfoil root and a first height location on the airfoil leading edge, a midspan region ("S2") between the first height location and a second height location on the airfoil leading edge located radially outward from the first height location; an outer span region ("S3") between the second height location and the airfoil tip, wherein the airfoil has a normalized camber profile such that the normalized camber increases in the outer span region in a spanwise direction towards the tip and is more than 2.2 in the outer span region.

16 Claims, 6 Drawing Sheets

(56) References Cited

U.S. PATENT DOCUMENTS

| | | | |
|---|---|---|---|
| 2007/0297904 A1 | 12/2007 | Hoeger | |
| 2008/0118362 A1 | 5/2008 | Hu | |
| 2008/0131271 A1 | 6/2008 | Wood et al. | |
| 2008/0131272 A1 | 6/2008 | Wood et al. | |
| 2008/0148564 A1 | 6/2008 | Burton et al. | |
| 2008/0152505 A1* | 6/2008 | Burton et al. | 416/223 R |
| 2008/0181769 A1 | 7/2008 | Wilson et al. | |
| 2010/0054946 A1 | 3/2010 | Orosa | |
| 2010/0260609 A1 | 10/2010 | Wood et al. | |

OTHER PUBLICATIONS

Leroy H. Smith, Jr. et al., "Sweep and Dihedral Effects in Axial-Flow Turbomachinery", Transaction of the ASME, Sep. 1963.

U.S. Appl. No. 13/071,966, Mar. 25, 2001, Breeze-Stringfellow et al.

G. Scott McNulty et al., "The Impact of Forward Swept Rotors on Tip-Limited Low-Speed Axial Compressors", Proceedings of ASME/IGTI Turbo Expo, Jun. 16-19, 2003, Atlanta, GA.

Search Report and Written Opinion for corresponding International Patent Application No. PCT/US2012/029357, dated Nov. 30, 2012.

Gallimore, Simon J., et al., The Use of Sweep and Dihedral in Multistage Axial Flow Compressor Blading-Part II: Low and High-Speed Designs and Test Verification, Journal of Turbomachinery, Oct. 2002, vol. 124.

Previously designed airfoils incorporating sweep and dihedral to include General Electric GEnx Core 1, Row 9 airfoils implemented prior to Apr. 2005 and with reference to previously cited US Patent 6899526 to Doloresco et al. issued May 31, 2005.

Previously designed airfoils incorporating sweep and dihedral to include Joint Strike Fighter F136 Alternative Engine, Phase III, Row 5 airfoils implemented prior to Apr. 2005 and with reference to previously cited US Patent 6899526 to Doloresco et al. issued May 31, 2005.

* cited by examiner

HIGH CAMBER COMPRESSOR ROTOR BLADE

BACKGROUND OF THE INVENTION

This invention relates generally to jet propulsion engines, and more specifically to compressor airfoils used therein.

In a gas turbine engine air is pressurized in a compressor and mixed with fuel in a combustor for generating hot combustion gases. The combustion gases are discharged through turbine stages which extract energy therefrom for powering the compressor, and producing output power for use in driving a booster (low pressure compressor) and a fan in an exemplary turbofan aircraft engine application.

A multistage axial compressor includes cooperating rows of stator vanes and rotor blades which decrease in size to pressurize air in stages. The compressor vanes and blades have corresponding airfoils which typically vary in configuration as their size decreases from stage to stage for maximizing performance of the compressor. Compressor performance includes, for example, efficiency of compression, flow capability, and stall margin, which are all affected by the configuration of the vanes and blades.

More specifically, the flow or pressure distribution of the air as it is being compressed through the stator vanes and rotor blades is a complex three dimensional flow field varying circumferentially around the compressor, radially along the span of the vane and blade airfoils, and axially along the circumferentially opposite pressure and suction sides of the airfoils.

The airfoil pressure side is a generally concave surface cooperating with the opposite suction side, which is a generally convex surface, for efficiently pressurizing the air as it flows between blades in the axial downstream direction between the leading and trailing edges thereof. The pressure distribution of the air undergoing compression varies from the radially inner root of the airfoil to the radially outer tip of the airfoil which is spaced closely adjacent to a surrounding compressor casing to provide a suitable radial gap or clearance therewith.

The airfoil, itself, may be supported from the compressor rotor in any suitable manner such as being formed integrally therewith in a unitary blisk configuration, or each rotor airfoil may have an integral platform and dovetail for mounting the compressor blade in a corresponding dovetail slot formed in the perimeter of the compressor rotor.

Axial and mixed flow compressor blades that are designed to compress the air usually have a rotor or number of rotors that rotate inside a stationary casing and act to raise the total pressure and temperature of the flow passing through the machine. The compressor rotor blades carry a lift on the body of the airfoil that manifests itself as a higher static pressure on the pressure surface of the airfoil and a lower static pressure on the suction surface of the airfoil. Generally a small gap exists between the tip of the compressor rotor and the radially adjacent casing flowpath. The pressure difference between pressure side and suction side of the airfoil drives flow through the tip gap of the compressor rotor. This tip flow can roll up into a vortex, which tends to collect on the pressure side surface of the circumferentially adjacent blade, leading to high levels of loss and blockage in the compressor tip region. As this blockage spreads across the compressor rotor tip, the ability of the compressor to produce a pressure rise decreases, and may result in a stall in some cases. This problem is exacerbated by weak flow near the endwalls, caused by cumulative effects of skin friction and secondary flows. Weak endwall flow allows the aforementioned vortices to remain in the rotor tip region, rather than being convected downstream.

In the art, casing treatments, such as circumferential grooves have sometimes been used to control or reduce the tip leakage and improve stall margin, but with an associated efficiency penalty. While these methods serve to reduce tip leakage flow levels, they do not control losses and blockage created by the remaining tip flow. In conventional designs, it is generally accepted that pressure and velocity profiles will be somewhat weak in the endwall region, due to the aforementioned loss mechanisms.

Accordingly, it would be desirable to have a compressor rotor blade having an airfoil with specific features that can reduce the propagation of the flow blockage across the blade passage thereby facilitating improvement of the compressor stall margin. It is desirable to have a compressor rotor blade having an airfoil that can strengthen endwall flow speed and pressure to facilitate reduction of tip blockage and increase throttle margin.

BRIEF DESCRIPTION OF THE INVENTION

The above-mentioned need or needs may be met by exemplary embodiments disclosed herein which provide a rotor blade having an airfoil for a compressor, the airfoil having an airfoil root, an airfoil tip located at a spanwise distance from the airfoil root, a leading edge extending from the airfoil root to the airfoil tip, an inner span region, a midspan region and an outer span region, wherein the airfoil has a normalized camber profile such that the normalized camber increases in the outer span region in a spanwise direction towards the tip and is more than 2.2 in the outer span region. In one embodiment, the normalized camber in the outer span region is greater than 2.0 and the normalized camber in the inner span region is greater than 1.7 wherein the first height location is located at 10% span and the second height location is located at 90% span from the root. In another embodiment, the airfoil leading edge has a dihedral between about −10 degrees and about +10 degrees in the inner span region and the outer span region.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
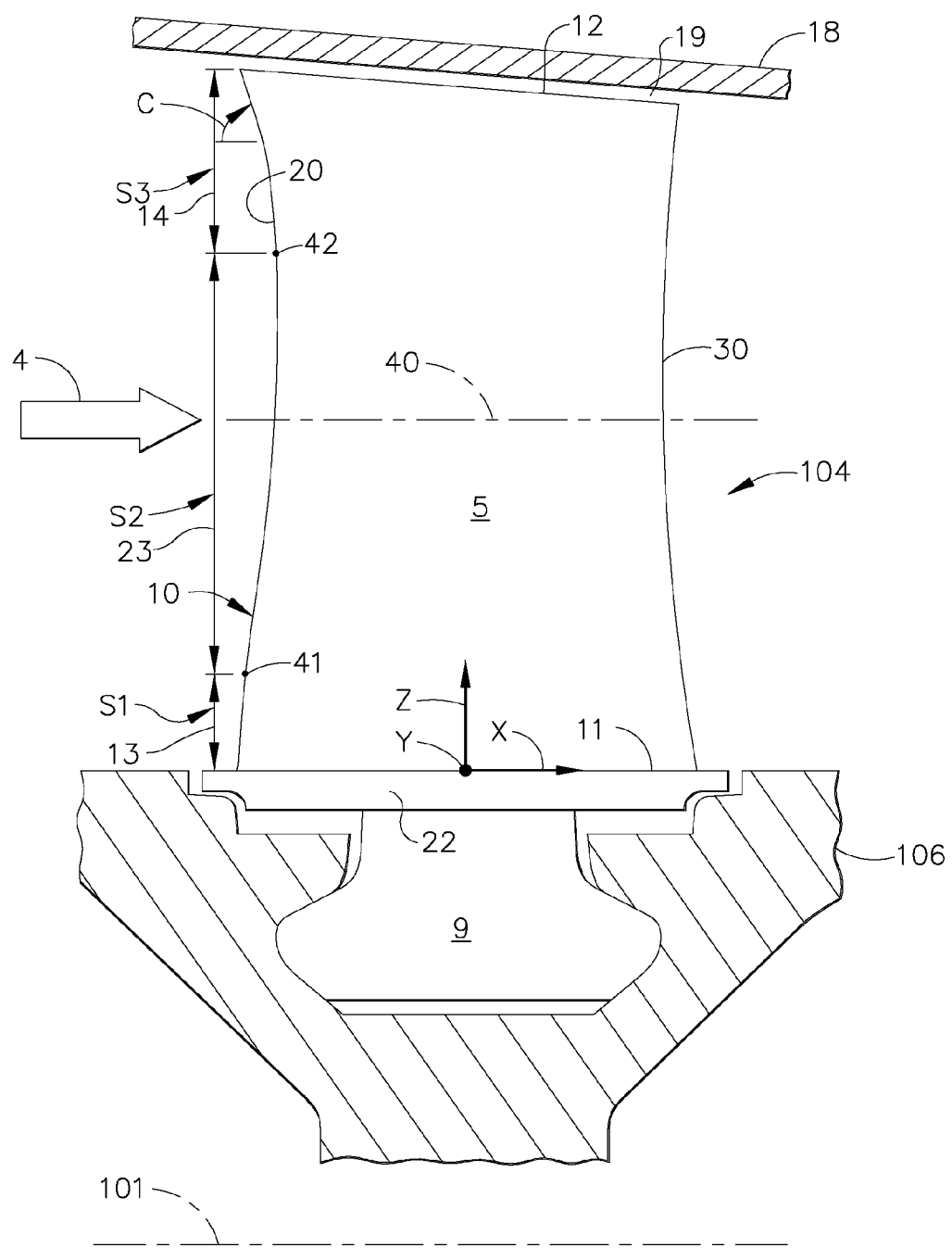
FIG. 1 is a partly sectional side view of a row of compressor rotor blades in a multistage axial compressor constructed according to an aspect of the present invention.
Figure 6:
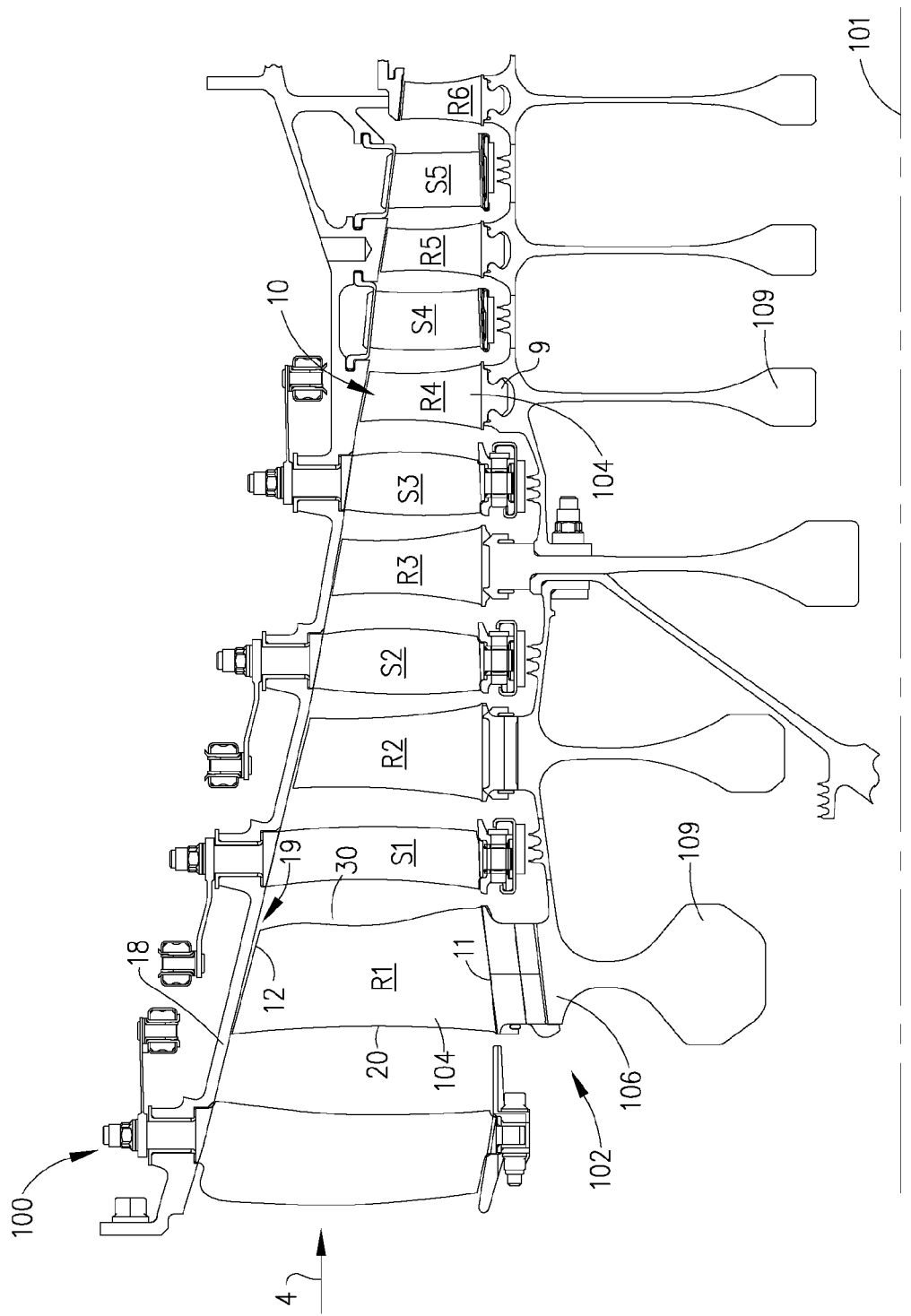
FIG. 6 is a schematic cross-sectional view of a multi-stage compressor having a row of compressor rotor blades according an exemplary embodiment of the present invention.

Referring to the drawings wherein identical reference numerals denote the same elements throughout the various views, FIG. 1 is a schematic cross-sectional view of a portion a partly sectional side view of a row of compressor rotor blades in a multistage axial compressor constructed according to an aspect of the present invention. FIG. 6 is a schematic cross-sectional view of a multi-stage compressor 100 having a row of compressor rotor blades 104 having airfoils 10 according an exemplary embodiment of the present invention, as described herein below.

Illustrated and shown in part in FIG. 6 is a row of compressor rotor stages 102 comprising compressor blades 104 suitably mounted to a compressor rotor 106 of a multistage axial compressor 100 in a gas turbine engine. The compressor 100 has several stages of stator vanes (shown as S1, S2, etc.) cooperating with corresponding compressor rotor blades (shown as R1, R2, etc.) which decrease in size in the downstream (axial) direction as air 4 is compressed during operation. The rotor 106 is axisymmetrical around the axial centerline axis 101 of the engine and supports a full row of the blades 104 within an annular outer casing 18. A small gap 19 exists between the tip 12 of the compressor rotor blade 104 and the radially adjacent casing 18. The rotor 106 further comprises one of more disks 109 that support the blades.

Each compressor rotor blade 104 includes an airfoil 10 extending in along a radial axis Z (the direction referred to herein as "span", see FIG. 1) between the perimeter of the rotor and the inner surface of the casing 18. The airfoil may be integrally formed with the rotor 106 in a blisk configuration (not shown), or may be removably joined thereto in a conventional manner, such as for example, using a circumferential dovetail 9 shown in FIGS. 1, 2 and 6 or an axial dovetail shown in rotor 1 (R1) in FIG. 6. Other known dovetail forms, such as an axially angled dovetail (not shown) configuration may alternatively be used to support the blade 104 in a rotor. Each blade 104 may include an integral platform 22 which defines the inner boundary for the air being compressed. In the exemplary embodiments shown in FIGS. 1 and 2, an integral dovetail 9 extends from the platform 22 in a unitary configuration with the blade 104 for being mounted in a complementary dovetail slot in the perimeter of the rotor 106. In the exemplary embodiment illustrated in FIGS. 1 and 2, the dovetail 9 is a circumferential entry dovetail for suitably mounting in the perimeter of the rotor 106.

Figure 2:
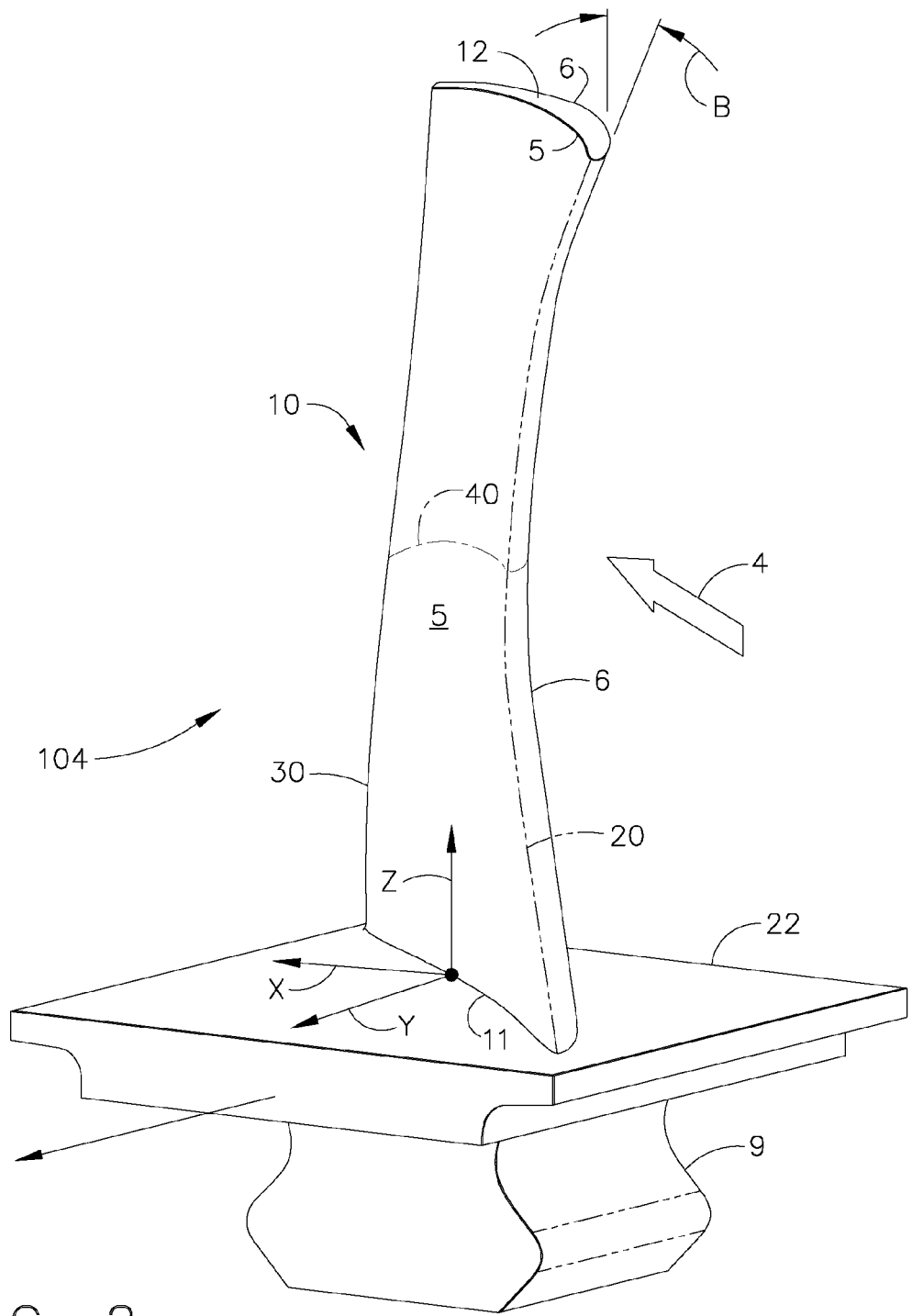
FIG. 2 is an isometric view of an exemplary one of the compressor rotor blades illustrated in FIG. 1 in isolation.

The compressor airfoil 10 is illustrated in a preferred embodiment in FIGS. 1 and 2 and includes circumferentially or laterally opposite pressure and suction sides 5, 6. The airfoil pressure side 5 is generally concave and precedes the generally convex suction side 6 as the airfoil rotates in the circumferential direction, represented by the Y axis (see FIG. 1), atop the rotor 106. The axial axis X is parallel with the compressor centerline axis 101 and represents the generally downstream direction of the air 4 as it undergoes compression through the multiple stages of the compressor 100 (see FIG. 6).

The corresponding surfaces of the pressure and suction sides 5, 6 are joined together at axially or chordally opposite leading and trailing edges 20, 30 and extend in the span direction (Z-axis in FIG. 1) from a radially inner root 11 at the junction with the platform to a radially outer tip 12 that is located at a spanwise distance from the root 11 as shown in FIG. 1. As shown in FIGS. 1 and 6, the airfoil tip 12 is disposed closely adjacent to the inner surface of the surrounding casing 18 and defines a radial clearance or gap 19 therebetween extending between the leading and trailing edges 20, 30 of the airfoil 10. The generally concave configuration of the airfoil pressure side 5, and the generally convex configuration of the airfoil suction side 6 are defined for pressurizing the air 4 as it flows downstream between the compressor rotor blades 104 in each stage of the compressor 100.

In one aspect of the present invention, as described in detail below, airfoil 10 has certain geometries having specific camber distributions for the airfoil 10 and specific dihedral features for the leading edge 20 and the resulting geometries near the airfoil tip 12 serve to pull relatively weaker airflow out of the airfoil tip region radially inwards near the tip along the pressure side 5 surface of the airfoil 10. This weak flow then mixes with the main body of airflow 4, rather than building up in the airfoil tip region causing inefficiencies and potential stall. The specific features of the airfoil 10 described herein thereby facilitate improvement in the stall margin and extending the throttle range of the airfoil.

Some of the specific airfoil features as described in detail herein below contribute to the advantages of the present invention. For example, a dihedral profile at the leading edge 20 having a negative dihedral at tip 12 contributes to a radially concave airfoil shape on the blade pressure side 5 surface near tip, which produces a radial velocity component towards the engine centerline 101. This also discourages centrifuging of flow towards the blade tip 12 on the blade pressure side 5 surface. Similarly, a negative dihedral at the trailing edge 30 near the tip region may be used for further convection of weak flow out of the critical tip region. Further, a specific tip dihedral gradient at the leading edge (and possibly trailing edge) causing a high slope of this geometric parameter, results in a curled blade shape near the tip delaying the propagation of weak flow across the rotor passage between circumferentially adjacent airfoils. Further, a forward sweep in the tip region, (such as, for example, shown as "C" in FIG. 1), may be used to reduce creation of undesirable tip vortex and reduces accumulation of boundary layer flow in the tip region.

FIGS. 1-2 show a compressor rotor blade 104 according to one embodiment of the present invention. It has an airfoil 10 having an airfoil root 11, an airfoil tip 12 located at a spanwise distance from the airfoil root 11, a leading edge 20 extending from the airfoil root 11 to the airfoil tip 12, a trailing edge 30 extending from the airfoil root 11 to the airfoil tip 12, airfoil pressure and suction sides 5, 6 extending between the leading edge 20 and the trailing edge 30. As shown in FIG. 1, the airfoil 10 leading edge 20 has a first inner span region 13 (shown as "S1") between the airfoil root 11 and a first height location 41 on the leading edge, a midspan region 23 (shown as "S2") between the first height location 41 and a second height location 42 on the airfoil leading edge 20 located radially (spanwise) outward from the first height location and an outer span region 14 (shown as "S3") between the second height location 42 and the airfoil tip 12. The span (alternatively referred to as span height) extends from the root 11 to the tip 12 of the airfoil 10 in the spanwise direction. The spanwise direction is the direction shown as "Z" axis in FIG. 1. In an exemplary embodiment, the first height location 41 is located at about the 10% span and the second height location is located at about 80% span.

The terms "Dihedral" (or, alternatively, "dihedral angle") and "sweep" as used herein, are conventional terms used in the design of airfoils (see, for example, Leroy H. Smith, JR. et. al, "Sweep and Dihedral Effects in Axial-Flow Turbomachinery", Transaction of the ASME, September, 1963). A dihedral angle, as used herein, is shown as angle "B" in FIG. 2 for illustration purposes. The angle B, although shown at the leading edge tip of the airfoil 10 for illustration purposes, may exist at other locations on the airfoil, such as for example, the leading edge 20 and trailing edge 30. Aerodynamic sweep is a conventional parameter represented by a local sweep angle which is a function of the direction of the incoming air and the orientation of the airfoil surface in both the axial, and circumferential or tangential directions. The sweep angle is defined in detail in the U.S. Pat. No. 5,167,489, and is incorporated herein by reference. In the sign convention commonly used in the art, the aerodynamic sweep angle is represented as a negative value (−) for forward sweep, and a positive value (+) for aft sweep.

Figure 3:
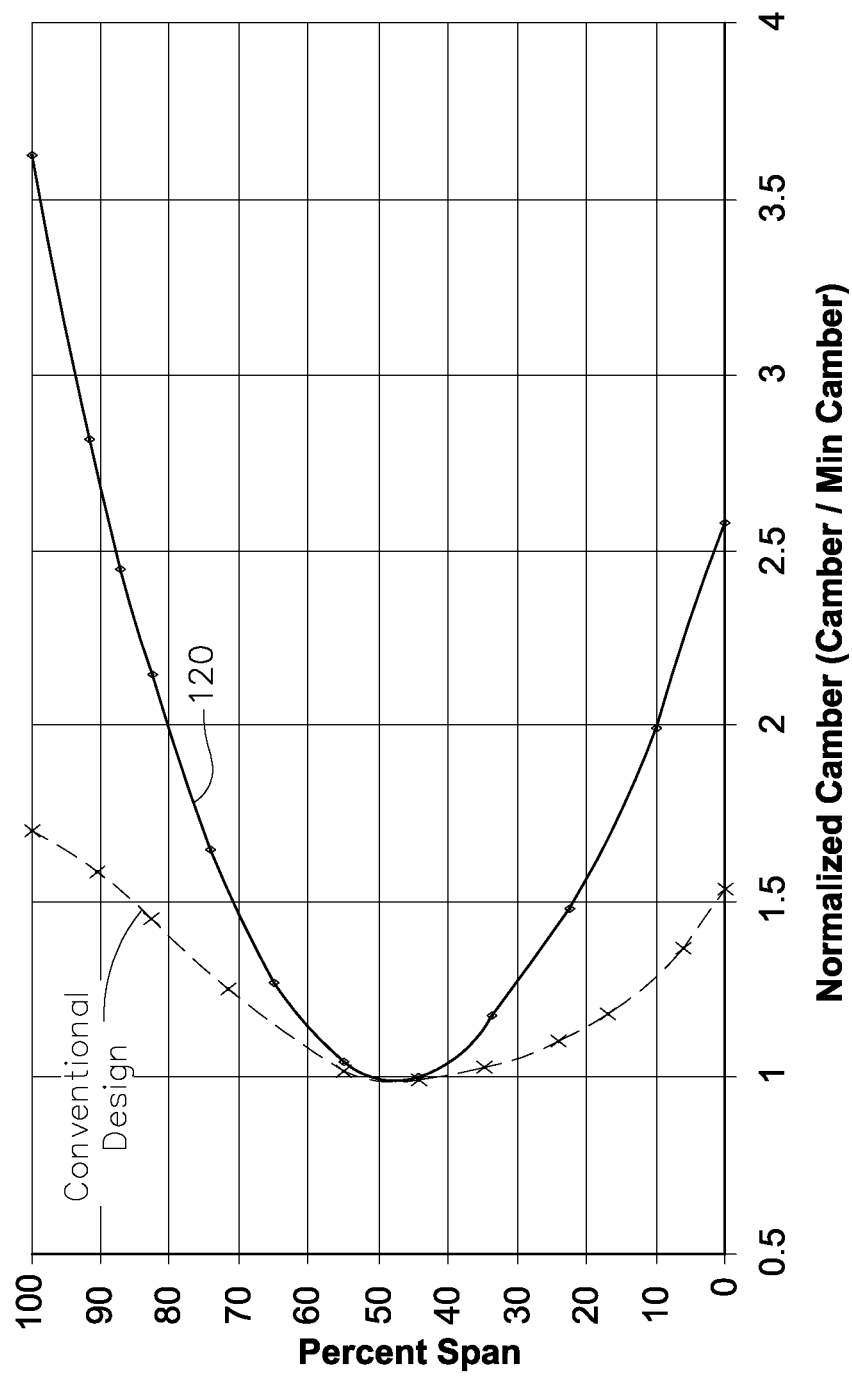
FIG. 3 is a graph plotting airfoil normalized camber over the radial span of the airfoil of the blade illustrated in FIG. 1 in an exemplary embodiment.

In one aspect of the present invention, the airfoil 10 has a normalized camber profile 120 (see FIG. 3 for example) such that the normalized camber increases in the outer span region 14 in a spanwise direction towards the tip 12 and is more than 2.2 in the outer span 14 region. In this context, "camber" (or alternatively, "camber angle") of an airfoil or blade as used herein has the conventional meaning known in the art. That is, airfoil camber (or alternatively, "camber angle") is the difference in the metal angles between the leading and trailing edges of the airfoil. As used herein, the term "normalized camber" at a spanwise location is the camber at that particular location divided by the minimum camber. The minimum camber used for normalization may occur, but not necessarily, at the midspan location, such as shown as item 40 in FIG. 1. An exemplary normalized camber profile (i.e., distribution in the spawise direction) according to an exemplary embodiment of the present invention is shown in FIG. 3. In a preferred embodiment of the present invention, the second height location 42 is located at a span of about 80% from the root and the normalized camber at the airfoil tip is at least 2.5. See FIG. 3. In another aspect of the present invention, the normalized camber of the airfoil 10 in the inner span region decreases in the inner span region in a spanwise direction from the root. In a preferred embodiment, the first height location 41 is located at a span of about 10% from the root and the normalized camber in the inner span region is at least 2. In another embodiment, the airfoil 10 the second height location 42 is located at a span of about 80% from the root and the normalized camber at the airfoil tip is at least 2.5.

Figure 4:
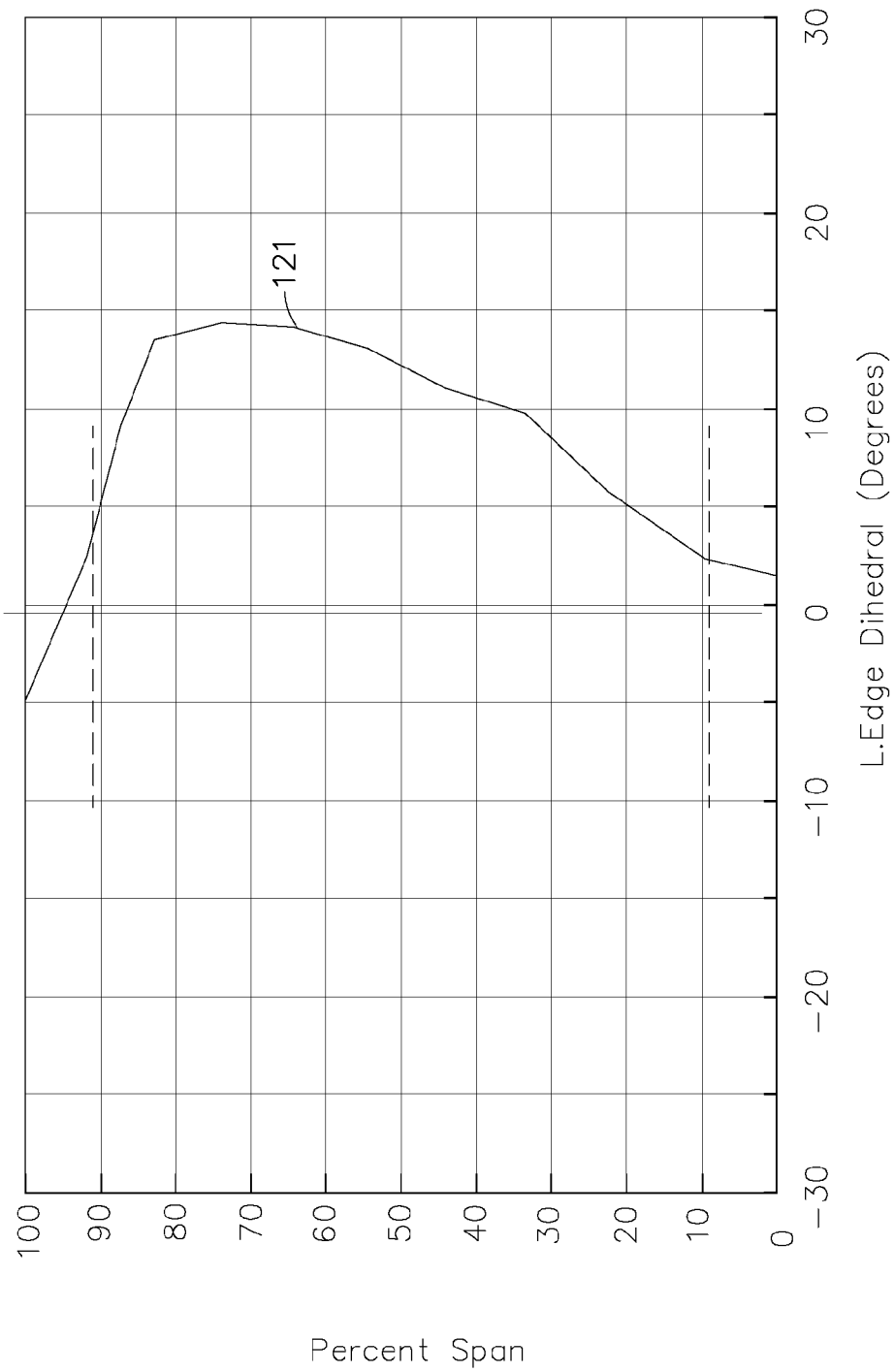
FIG. 4 is a graph plotting airfoil leading edge dihedral angle in degrees over the radial span of the airfoil of the blade illustrated in FIG. 1 in an exemplary embodiment.

In another aspect of the invention, the airfoil 10 may further comprise a leading edge 20 having a dihedral profile (see, for example, item 121, FIG. 4) such that the leading edge has decreasing dihedral angles in the outer span region in a spanwise direction towards the tip 12. In a preferred embodiment, the airfoil 10 leading edge 20 has a negative dihedral angle at the tip 12, such as, for example, shown in FIG. 4. FIG. 4 shows an exemplary airfoil leading edge 20 dihedral profile according to one embodiment of the present invention of an airfoil 10 shown in FIG. 1 for example. In a preferred embodiment, the leading edge dihedral angle at the airfoil tip 12 is negative. In the context, a negative dihedral is one that would have a spanwise concave shape for the pressure side 5 of the airfoil 10. In another exemplary embodiment, the airfoil 10 has a leading edge dihedral angle profile (see FIG. 4) that decreases at a substantially constant rate of change with respect to the span. In a preferred exemplary embodiment, the outer span region 14 extends from about 90% of the span to the airfoil tip 12. See FIG. 4. In another exemplary embodiment, the airfoil 10 has a leading edge 20 having a dihedral profile (see FIG. 4) in the spanwise direction such that the leading edge has increasing dihedral angles in the inner span region 13 from the root and decreasing dihedral angles in the outer span region towards the tip 12. In an exemplary embodiment of an airfoil 10 having a dihedral profile shown in FIG. 4, the airfoil 10 has a leading edge 20 having increasing dihedral angles and decreasing normalized camber in the inner span region 13 from the root, and decreasing dihedral angles and increasing normalized camber in the outer span region 14 towards the tip. In another exemplary embodiment the leading edge 20 has a negative dihedral angle at the tip 12 and a positive dihedral angle at the airfoil root 11.

FIG. 6 shows a compressor 100 for a gas turbine engine according to an aspect of the present invention. The compressor 100 has one or more rotor stages. FIG. 6 shows a compressor 100 having multiple rotor stages, each rotor stage 102 having a plurality of rotor blades 104 spaced circumferentially around a rotor hub 106 with a longitudinal centerline axis 101, each rotor blade comprising an airfoil 10 as described previously herein. The airfoil 10 has an inner span region 13 ("S1"), a midspan region 23 ("S2"), and an outer span region 14 ("S3") as described before. In one embodiment, in the compressor 100, at least one of the rotor blades 104 has an airfoil 10 having a normalized camber profile 120 such that the normalized camber increases in the outer span region 14 in a spanwise direction towards the tip 12 and is more than 2.2 in the outer span 14 region. The compressor 100, in various other embodiment may have one or rotors having airfoils that have camber and dihedral features described in detail previously. In another exemplary embodiment of the compressor 100 the normalized camber in the outer span region 14 is greater than 2.0 and the normalized camber in the inner span region 13 is greater than 1.7 wherein the first height location 41 is located at 10% span and the second height location 42 is located at 90% span from the root 11. Further, in another exemplary embodiment, the compressor 100 may have an airfoil leading edge 20 having a dihedral between about −10 degrees and about +10 degrees in the inner span region 13 and the outer span region 14.

The airfoils 10 according to various embodiments of the present invention described previously herein having camber distribution profile (see item 120 in FIG. 3 for example) strengthen flow in the endwall regions of the compressor 100. The specific features of the airfoil 10 described herein increase the pressure and axial velocity levels in the critical endwall regions of the compressor 100. This in turn reduces the amount of weak flow that becomes collected near the rotor tip 12 because of increased convection of weak flow downstream, out of the rotor passage between circumferentially adjacent blades 104 in the compressor 100. Since the accumulation of weak flow in the rotor tip passage is decreased for any given throttle setting, the stall margin of the machine is increased. In another aspect of the present invention, FIG. 6 shows a compressor 100 for a gas turbine engine. The compressor 100 has a rotor stage 102 having rotor blades 104 spaced circumferentially around a rotor hub 106 with a longitudinal centerline axis 101. At least one of the rotor stages (shown as R1, R2, etc. in FIG. 6) has rotor blades having airfoils 10, having the features according to various embodiments of the present invention such as described previously herein. Analyses using known methods, such as Viscous 3-D CFD analyses, were used to compare airfoils 10 with the aforementioned geometry features of the present invention to conventional airfoils. The analyses predict over 5% improvement in throttle margin with no loss in design point efficiency. The geometry features of the airfoil 10, such as the normalized camber distribution (see FIG. 3 for example) and leading edge dihedral distribution (see FIG. 4 for example) improved the radial distribution of pressure and velocity. When compared on a normalized basis to conventional blades, the claimed camber levels are much higher near the endwalls (see FIG. 3). In one aspect of the present invention, a normalized camber distribution that is 1.0 near mid-span is used and increases as the root and tip of the blade are approached. The present invention enables use of relatively high normalized camber levels (2.5 for example) near the root 11 and at the tip (3.5 for example), whereas current state-of-the-art blading can use only normalized camber levels that do not exceed an average value of 1.5 and 2.0 at the hub and tip regions, respectively. Further, it is also beneficial to bound the leading edge dihedral between −10 and +10 degrees at the endwalls (FIG. 4), in order to produce a radial stacking distribution that further contributes to strong flow in the endwalls.

Figure 5:
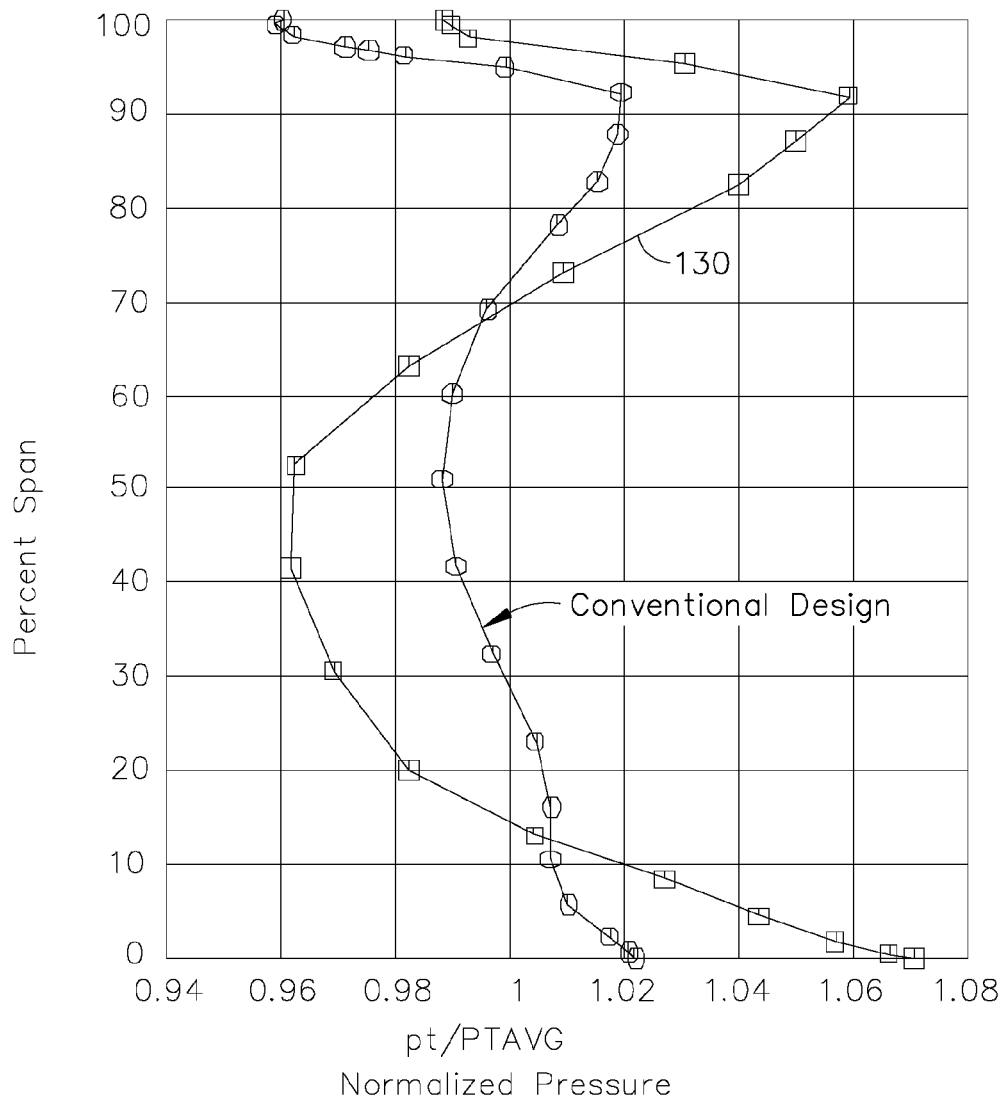
FIG. 5 is a graph plotting normalized pressure over the radial span of the airfoil of the blade illustrated in FIG. 1 in an exemplary embodiment of a compressor.

The specific geometry features of the airfoil 10 according to the various embodiments of the present invention described previously herein create beneficial pressure profiles at the root 11 and tip 12 regions of the airfoils in the compressor 100. This is shown in FIG. 5. As can be seen from the normalized pressure distribution shown in FIG. 5, the embodiments of the present invention, as described previously increase the normalized pressure near the hub and tip of the compressor 100 as compared to conventional designs. See item 130 in FIG. 5. The improved pressure and velocity distributions of the present invention contributes to less blockage and loss near the rotor airfoil tip 12 region, thereby extending throttle range for the compressor 100.

Analyses using known methods have shown over 5% improvement in throttle margin with no loss in design point efficiency for embodiments of the present invention described herein. In conventional compressors having conventional blades and airfoils, as the compressor is throttled towards stall, blockage accumulates near the rotor tip on the pressure surface and propagates tangentially across the rotor passage. As the entire passage width becomes blocked, the capacity of a conventional compressor having conventional rotor blade/airfoil to produce a pressure increase is reduced, and stall may result. Comparison of rotor blades/airfoils run at similar conditions, with and without the embodiments of present invention described previously herein, shows that the aforementioned features of the present invention cause the region of blockage to be drawn radially down the pressure surface of the blade. This increases airfoil tolerance to throttling, increasing stall margin for the various embodiments of the present invention described herein.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a compressor comprising: an airfoil root, an airfoil tip located at a spanwise distance from the airfoil root, a leading edge extending from the airfoil root to the airfoil tip, a trailing edge extending from the airfoil root to the airfoil tip, airfoil pressure and suction sides extending between the leading edge and the trailing edge; an inner span region ("S1") between the airfoil root and a first height location on the airfoil leading edge; a midspan region ("S2") between the first height location and a second height location on the airfoil leading edge located radially outward from the first height location; an outer span region ("S3") between the second height location and the airfoil tip; and wherein the airfoil has a normalized camber profile such that the normalized camber increases in the outer span region in a spanwise direction towards the tip and is more than 2.2 in the outer span region.

2. An airfoil according to claim 1 wherein the second height location is located at a span of about 80% from the root and the normalized camber at the airfoil tip is at least 2.5.

3. An airfoil according to claim 1 wherein the normalized camber decreases in the inner span region in a spanwise direction from the root.

4. An airfoil according to claim 1 wherein the first height location is located at a span of about 10% from the root and the normalized camber in the inner span region is at least 2.

5. An airfoil according to claim 4 wherein the second height location is located at a span of about 80% from the root and the normalized camber at the airfoil tip is at least 2.5.

6. An airfoil according to claim 1 further comprising a leading edge having a dihedral profile such that the leading edge has decreasing dihedral angles in the outer span region in a spanwise direction towards the tip.

7. An airfoil according to claim 6 wherein the leading edge has a negative dihedral angle at the tip.

8. An airfoil according to claim 1 further comprising a leading edge having a dihedral profile in a spanwise direction such that the leading edge has increasing dihedral angles in the inner span region from the root and decreasing dihedral angles in the outer span region towards the tip.

9. An airfoil according to claim 1 wherein the leading edge has a negative dihedral angle at the tip and a positive dihedral angle at the airfoil root.

10. An airfoil according to claim 1 further comprising a leading edge having increasing dihedral angles and decreasing normalized camber in the inner span region from the root, and decreasing dihedral angles and increasing normalized camber in the outer span region towards the tip.

11. A airfoil according to claim 1 wherein the normalized camber in the outer span region is greater than 2.0 and the normalized camber in the inner span region is greater than 1.7 wherein the first height location is located at 10% span and the second height location is located at 90% span from the root.

12. A airfoil according to claim 11 wherein the leading edge has a dihedral between about −10 degrees and bout +10 degrees in the inner span region and the outer span region.

13. A compressor for a gas turbine engine comprising: a rotor stage having a plurality of rotor blades spaced circumferentially around a rotor hub with a longitudinal centerline axis, each rotor blade comprising an airfoil having an airfoil root, an airfoil tip located at a spanwise distance from the airfoil root, a leading edge extending from the airfoil root to the airfoil tip, a trailing edge extending from the airfoil root to the airfoil tip, airfoil pressure and suction sides extending between the leading edge and the trailing edge; an inner span region ("S1") between the airfoil root and a first height location on the airfoil leading edge a midspan region ("S2") between the first height location and a second height location on the airfoil leading edge located radially outward from the first height location; an outer span region ("S3") between the second height location and the airfoil tip; and wherein at least one of the rotor blades has an airfoil having a normalized camber profile such that the normalized camber increases in the outer span region in a spanwise direction towards the tip and is more than 2.2 in the outer span region.

14. A compressor according to claim 13 further comprising a leading edge having increasing dihedral angles and decreasing normalized camber in the inner span region from the root, and decreasing dihedral angles and increasing normalized camber in the outer span region towards the tip.

15. A compressor according to claim 13 wherein the normalized camber in the outer span region is greater than 2.0 and the normalized camber in the inner span region is greater than 1.7 wherein the first height location is located at 10% span and the second height location is located at 90% span from the root.

16. A compressor according to claim 15 wherein the leading edge has a dihedral between about −10 degrees and about +10 degrees in the inner span region and the outer span region.

* * * * *

UNITED STATES PATENT AND TRADEMARK OFFICE
CERTIFICATE OF CORRECTION

PATENT NO. : 8,702,398 B2  
APPLICATION NO. : 13/072027  
DATED : April 22, 2014  
INVENTOR(S) : Breeze-Stringfellow et al.

Page 1 of 1

It is certified that error appears in the above-identified patent and that said Letters Patent is hereby corrected as shown below:

In the Specification

In Column 5, Line 26, delete "spawise" and insert -- spanwise --, therefor.

In the Claims

In Column 8, Line 33, in Claim 11, delete "A airfoil" and insert -- An airfoil --, therefor.

In Column 8, Line 38, in Claim 12, delete "A airfoil" and insert -- An airfoil --, therefor.

In Column 8, Line 39, in Claim 12, delete "bout" and insert -- about --, therefor.

In Column 8, Line 51, in Claim 13, delete "edge a" and insert -- edge; a --, therefor.

Signed and Sealed this
Fifteenth Day of July, 2014

Michelle K. Lee
*Deputy Director of the United States Patent and Trademark Office*